United States Patent [19]

Adams

[11] Patent Number: 4,987,983

[45] Date of Patent: Jan. 29, 1991

[54] DUAL-MODE POWERED CLUTCH ACTUATOR

[76] Inventor: Madison B. Adams, 9439 San Jose Blvd., Jacksonville, Fla. 32217

[21] Appl. No.: 380,290

[22] Filed: Jul. 17, 1989

[51] Int. Cl.$^5$ .................. F16D 67/02; F16D 23/12
[52] U.S. Cl. .................. 192/13 R; 91/391 A; 192/83; 192/91 R; 192/99 S
[58] Field of Search .......... 192/83, 85 C, 85 V, 192/91 R, 99 S, 13 R; 188/151 A; 91/391 A

[56] References Cited

U.S. PATENT DOCUMENTS

| | | | |
|---|---|---|---|
| 2,365,960 | 12/1944 | Ingres | 91/391 A |
| 2,596,040 | 5/1952 | Nutt | 192/99 S |
| 2,706,020 | 4/1955 | Freers et al. | 91/391 A |
| 2,809,725 | 10/1957 | Ayers, Jr. | 91/391 A |
| 3,063,427 | 11/1962 | Hill | 91/391 A |
| 3,263,428 | 8/1966 | Highley | 91/391 A |
| 3,677,379 | 7/1972 | Adams | 192/91 R |

FOREIGN PATENT DOCUMENTS

60-249733 12/1985 Japan .................. 192/85 C
732252 6/1955 United Kingdom .................. 192/83

Primary Examiner—Rodney H. Bonck
Attorney, Agent, or Firm—Arthur G. Yeager

[57] ABSTRACT

The actuator includes a power-assisted main mechanical linkage connecting the clutch pedal lever to the clutch plate lever. The power-assisting assembly is supplied high pressure air and is actuatable by pedal-driven movement of the main linkage. A manually operable piston and cylinder device operates to vary the movement of the linkage and therefore alter the action of the applied force to the main linkage for a reduced pedal stroke mode of operation. The actuator is operable in one of two modes: a power-assisted mechanical mode wherein mechanical force applied to the linkage is dominant; and a selectable power-assisted/mechanical mode with a reduced pedal stroke length wherein the power-assist is the dominant operating force. In either mode, the main mechanical linkage is always operatively connected between the pedal lever and plate lever to provide for purely mechanical operation in the event of air pressure failure.

30 Claims, 6 Drawing Sheets

DUAL-MODE POWERED CLUTCH ACTUATOR

BACKGROUND OF THE INVENTION

1. FIELD OF THE INVENTION

The present invention relates to power assisting assemblies for motor vehicles and particularly to heavy trucks designed for commercial use and often including a large number of forward gears/speeds.

2. PRIOR ART

The power transmission systems of many motor vehicles, particularly large trucks, are equipped with manual transmissions and friction-plate clutches. In manual operating gear-shifting mechanisms, the spring pressure of the clutch mechanism must be temporarily overcome to disengage the friction elements when the transmission is to be shifted from one gear to another. Typically, the clutch is operated by mechanical linkage connected to a foot pedal. The strong spring pressure of the clutch system that must be overcome for release renders clutches difficult to operate and has led to the development of a large variety of clutch boosters or similar assisting devices which are very often air pressure power assisting mechanisms.

Many power assist mechanisms employ systems that work off the movement of the pedal and result in a "soft pedal", i.e., one that requires little effort to operate. Unfortunately, these devices do not normally vary the travel of the pedal which may be up to ten inches. With any "high pedal" it is tempting for a driver to simply rest the left foot on the pedal between gear shifts. With a "soft pedal" the power assist can cause the driver to "ride the clutch" unwittingly which can in turn cause undue wear of the clutch assembly.

Some conventional power assist mechanisms also suffer an additional disadvantage in that they leave no provision for operation when air pressure is not available. In the present invention, the clutch mechanism is always mechanically operatively connected to the clutch pedal lever for "fail safe" operation.

These problems as discussed above should be solved in conjunction with the desired arrangement of providing both a long pedal stroke with a high mechanical advantage, and a short pedal stroke with a lower mechanical advantage because such an arrangement reduces the amount of time the clutch will be in slippage. This extends the life of the clutch.

The best possible solution would be a clutch mechanism that combines a long stroke high pedal mode with a higher mechanical advantage for precise control with a power-assisted low pedal mode and lower mechanical advantage which will operate the clutch quicker with less slippage and reduce the length of travel of the pedal thus requiring reduced effort on behalf of the driver. The low pedal mode will also provide for ease of operation during normal driving and will allow the driver to rest the heel on the floor instead of the pedal during driving which will also protect the clutch from partial release or damage. Ideally, the driver should be able to select the low pedal mode at will.

Finally, most clutch mechanisms employ a clutch brake. The clutch brake is used to stop the gear movement when in neutral during engine idle. The clutch brake is engaged by operating the clutch release system to its extreme position beyond that for disengaging the clutch. The most desirable clutch mechanism should eliminate the possibility of inadvertently engaging the clutch brake when shifting gears. The present invention allows the foot pedal in low pedal mode to travel all the way to the floor in low pedal mode without engaging the clutch brake. The linkage employed can only operate the clutch release system to its extreme position, thus engaging the clutch brake, in the high pedal mode. The high pedal mode is usually used only when starting the truck and moving around a freight yard and the like where extremely precise control is desired and where the clutch brake is necessary. Of course, with experience, a driver may use the low pedal mode exclusively if so desired.

An example of the most pertinent prior art is applicant's invention disclosed in U.S. Pat. No. 3,677,379 where the pedal linkage is connected to a first lever, the clutch plate linkage is connected to a second lever, and the levers can be locked together or operated separately. When locked together, foot pressure on the pedal will be transmitted to the plate release mechanism.

The present invention has the functional equivalent of a structure that keeps the levers in operable mechanical connection at all times and thus provides a valuable "fail-safe" advantage. In addition to being always operable in manual, two power-assisted modes of operation are available: a high pedal mode and a low pedal mode. The two modes of operation employ a linkage that connects the pedal linkage to the clutch plate linkage and utilizes pin and shaft mounted levers instead of a more expensive rack and pinion mechanism used in the prior art. In addition, the present invention will be easier to maintain than prior art systems. Finally the linkage mechanism will prevent engagement of an associated clutch brake in the low pedal mode and provides the driver with a better "feel" of the system than other known devices.

SUMMARY OF THE INVENTION

In one aspect of the invention, there is provided a clutch mechanism which includes a clutch pedal means and a movable clutch plate means, and the clutch pedal means has a predetermined length of stroke for operating the clutch plate means in response to manual forces applied to the pedal means. A clutch actuator includes a first linkage means between the pedal means and the plate means for transmitting movement of the pedal means to the plate means, and a selective means is operatively coupled to the first linkage means to vary the extent of movement thereof for reducing the stroke of the pedal means when selected. Power means is operably connected to the first linkage means and is responsive to movement thereof for forcibly transmitting movement of the pedal means in response to applied manual forces to the plate means and has a manually operable first fluid power means connected to the first linkage means. The first fluid power means is operated to reduce the stroke of its pedal means required to disengage the plate means. The power means and the first linkage means are continuously connected and perform the work of moving the clutch plate means during manual operation of the clutch pedal means through the stroke or the reduced stroke.

In several other aspects the first linkage means includes a pivotally mounted link for movement between first and second positions. The first fluid power means is coupled to the link for moving it to the second position for restricting movement of the first linkage means when the first fluid power means is operated. The power means includes a second fluid power means for moving the plate means in a disengaging direction and spring-biased valve means fluidly connected to it which is responsive to depression and relaxation of the pedal means whereby fluid is correspondingly supplied to and removed from the second fluid power means. The valve means includes a valve and a lever connected to the first linkage means which operates the valve when the pedal means is depressed and relaxed. The first linkage means includes a first lever connected to the clutch plate means which is operated by a power cylinder element and a piston element which is coupled between one element and the first lever. The first linkage means includes a second lever operatively connected to the first lever via a link in the first linkage means for movement in response to the pedal means for moving the first lever between first and second positions. The link is pivotally mounted to the second lever and movable by a power piston and cylinder device from a first position to a second position in which the clutch pedal means is movable through the reduced stroke length.

In accord with this invention when the power means is inoperable, the first linkage means performs all of the work of moving the clutch plate means. If the power means is selectively actuated the power means provides the dominant force in moving the clutch plate means through a selected reduced stroke or is a non-dominant force when the clutch pedal means is being moved through the predetermined length of stroke.

In yet another aspect the clutch mechanism includes a clutch brake and the first fluid power means restricts the movement of the first linkage means when the reduced shorter stroke length has been selected to inhibit engagement of the clutch brake by even full depression of the clutch pedal.

Thus, it is seen that various modes are permitted herein to assist the driver and to extend the life of the clutch and the clutch brake by providing a mode selection means for operating the plate means in the manual operation or a first power-assisted operation by movement of the pedal means through the first stroke length or operating the plate means in a second power-assisted operation of the pedal means through a second stroke length shorter than such first stroke length. This mode selection means includes the first power means operably connected to the first linkage means and responsive to movement thereof for forcibly transmitting movement of the pedal means to the plate means when supplied with pressurized fluid, and second selectively actuatable power means operably connected to one member for restricting movement of the first linkage means when selected. The first power means controls the clutch plate means in response to manual movement of the pedal means through the second stroke length when both of the first and second power means are actuated and the first power means controls the clutch plate means in response to manual movements of the pedal means through the first stroke length when the first power means is actuated.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the drawings in which:

DETAILED DESCRIPTION OF THE PREFERRED EMBODIMENT

Figure 1:
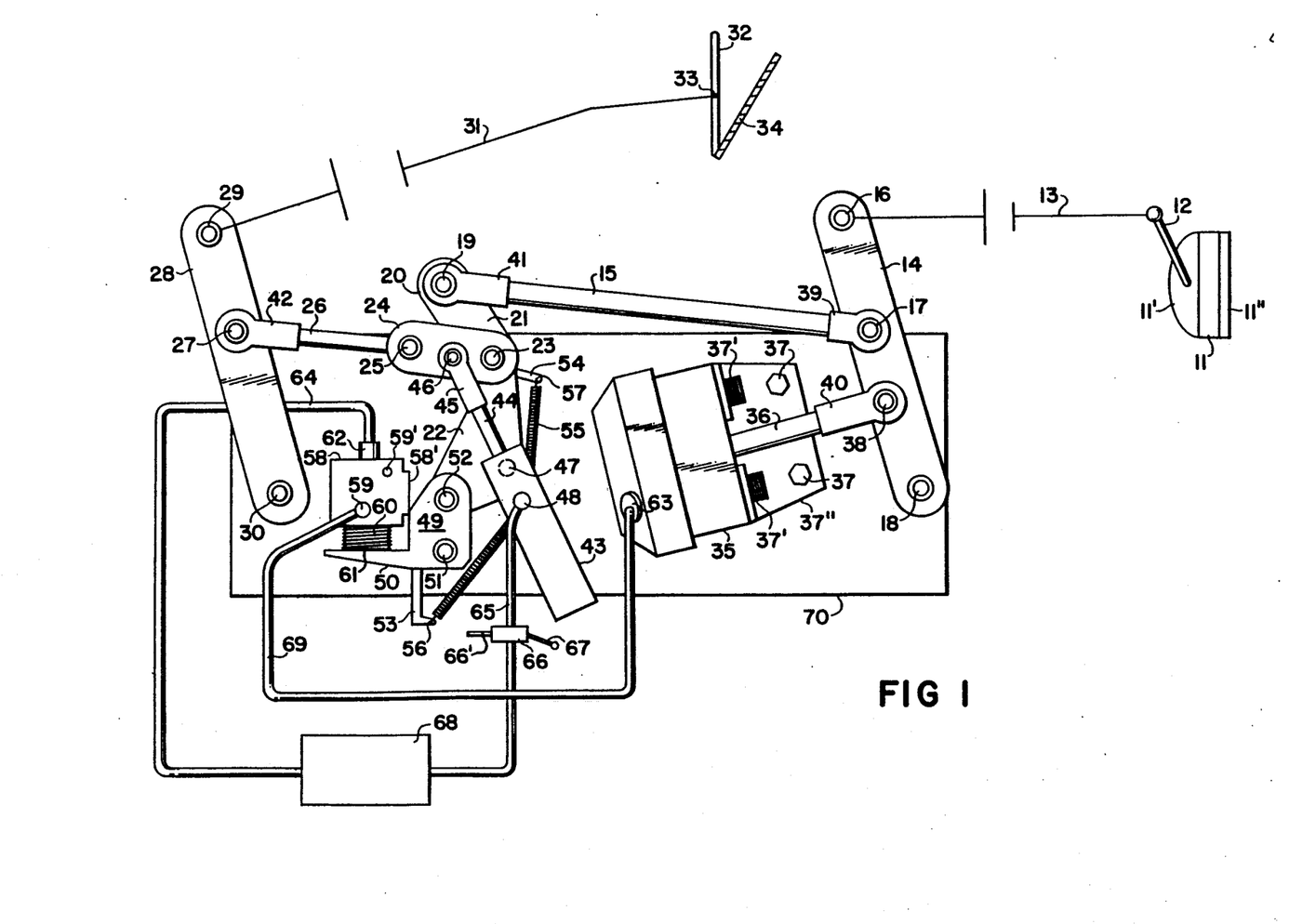
FIG. 1 is a side elevational view of the dual-mode powered clutch actuator in accord with the present invention.

With reference to the drawings, the dual-mode powered clutch actuator in accord with the present invention is illustrated in FIG. 1 and is depicted by the numeral 10. A pedal-operated spring-loaded friction clutch 11' has a movable plate 11 and a clutch brake 11" Clutch release lever 12 is shown positioned rearwardly for engagement of clutch plate 11. Release lever 12 is operatively connected to clutch operating linkage 13 which may be a rod or armored cable as understood in the art and is illustrated only pictorially. Clutch operating linkage 13 is connected via pin 16 to operating lever 14 which itself is pivotally mounted on a fixed shaft 18. Forward or rearward pivotal motion of operating lever 14 will cause release lever 12 to move forward or rearwardly, respectively, to disengage or engage, respectively, the clutch plate 11. A master operating rod 15 is connected to operating lever 14 via pin 17 and to master lever 20 via pin 19.

Master lever 20 is a unitary piece of metal with an upper arm portion 21 and a lower arm portion 22 and operates to direct pedal force to master operating rod 15. Staging link 24 is connected via pin 23 to master lever 20 at a point intermediate of arms 21 and 22. Staging link 24, which preferably includes a pair of spaced plates, is also connected via pin 27 to control lever 28 pivotally mounted on fixed shaft 30. The upper end of control lever 28 has a pin 29 for mounting pedal linkage 31 which connects to pedal 32 at point 33. Staging link 24 pivots on pin 23 for purposes of moving the position point of pin 25 in relation to the length of master lever 20 as it moves about pin 52.

From the description hereinabove, it can be seen that pedal 32 is always operationally and mechanically connected to release lever 12 via the linkage from control lever 28 to operating lever 14. As pedal 32 is depressed in a forward direction, pedal linkage 31 will pull on control lever 28 at pin 29. This action will cause forward, substantially horizontal movement of control rod 26 and the attached staging link 24. Master lever 20 will be pushed forwardly from the point of contact with pin 46 and link connection pin 23 with the result that arm 21 will push master operating rod 14 forwardly to disengage clutch plate 11 via movement of plate linkage 13 and release lever 12.

Power chamber 35, a conventional device well known in the art, has a return spring (not shown) and a piston rod 36 which is connected to operating lever 14 via pin 38. The power chamber 35 is rigidly mounted via bolts 37 and cylinder posts 37' and an angle bracket 37" or any other means appropriate in the circumstances. With a source of air pressure supplied to power chamber 35 both manual forces from the pedal 32 via control rod 26 and operating rod 15 and power-assist forces from piston rod 36 will be used to move operating lever 14. As understood in the art, the effective lengths of operating rod 15, piston rod 36 and control rod 26 can be adjusted via clevises 39, 41, 40 and 42, respectively, in order to provide for proper alignment and the correct lever action forces desired in a particular application.

The operating angle of control rod 26 movement is controlled by the pivoting of staging link 24 via high pressure air. Movement of staging link 24 is controlled by the operation of staging cylinder 43 having piston rod 44 which, via clevis 45, is mounted generally at the midpoint of staging link 24 via pin 46 and is also pivotally mounted to master lever 20 via pin 47. The staging link 24 itself is mounted on master lever 20 via pin 23. The staging cylinder 43 is a pneumatically retracted device with high pressure air supplied via inlet 48. With high pressure air supplied to staging cylinder 43, piston rod 44 will move downwardly as it retracts and will pull staging link 24 downwardly from its initial position with respect to the pivot point of pin 23, as clearly shown in FIG. 3 until pin 46 contacts lower arm 22 of lever 20. The downward pivotal movement of staging link 24 will pull on control lever 28 via control rod 26. From this point, foot pressure on pedal 32, which is now lowered, will be directed to master lever 20 at a lower position on master lever 20 at pin 25.

With reference again to FIG. 1, rocker link 49 has laterally extending valve operating arm 50 and is pivotally mounted on fixed shaft 51. Rocker link 49 is also connected to and supports lower arm 22 of master lever at pin 52. Spring 55 is mounted on rocker link extension arm 53 and staging link extension arm 54 via holes 56 and 57, respectively. Forward movement of master lever 24 will cause rocker link 49 to pivot around shaft 51, as shown by broken lines 49' of FIG. 2, against the resistance of springs 55 and 60 in a clockwise direction. Rigidly-mounted air control valve 58 has air outlet 59, exhaust port 59' and a valve operating button 61 spring-biased closed via spring 60. Upward movement of rocker link valve operating arm 50 due to pivotal movement of rocker link 49 will open valve 58 which in turn will supply air pressure via air line 69 to inlet 63 of power chamber 35. Air pressure to valve 58 is via inlet opening 62 from line 64 which is connected to a truck's standard high pressure air system 68. Air can be supplied to staging cylinder 48 via line 65 and staging valve 66 which is operated by a toggle arm 67, hereinafter more fully described.

Most of the apparatus is secured to housing 70 using fixed shafts 30, 51 and 18 and bolts 37 on power chamber 35. Power air control valve 58 is also mounted onto housing 70 by bolts (not shown) or any other appropriate means.

FIG. 1 illustrates the mode of operation hereinafter referred to as standard pedal mode. The pedal referred to is pedal 32 which may be about ten inches away from floor 34 when not being operated. If air pressure from system 68 is not available for whatever reason, downward pressure on pedal 32 will operate clutch plate 11 as follows. Pedal 32 movement will pull on pedal linkage 31 causing control lever 28 to pivot forwardly on shaft 30. Forward, substantially horizontal movement of control rod 26 will force master lever 20 forwardly via staging link 24. Forward movement of master lever 20 will cause forward movement of upper arm 21 further causing master operating rod 15 to push operating lever 14 forward. Release lever 12 will disengage clutch plate 11 via movement of plate linkage 13 connected to operating lever 14 at pin 16. In the standard pedal mode, which is primarily a "fail-safe" method of operation, the mechanical advantage of the assembly is set to be lower than would be usually required. The disengagement of the clutch is therefore much quicker and the clutch plate 11 moves further. This arrangement minimizes the wear of the clutch assembly 11' and thus reduces the expense and effort of readjustment.

Figure 2:
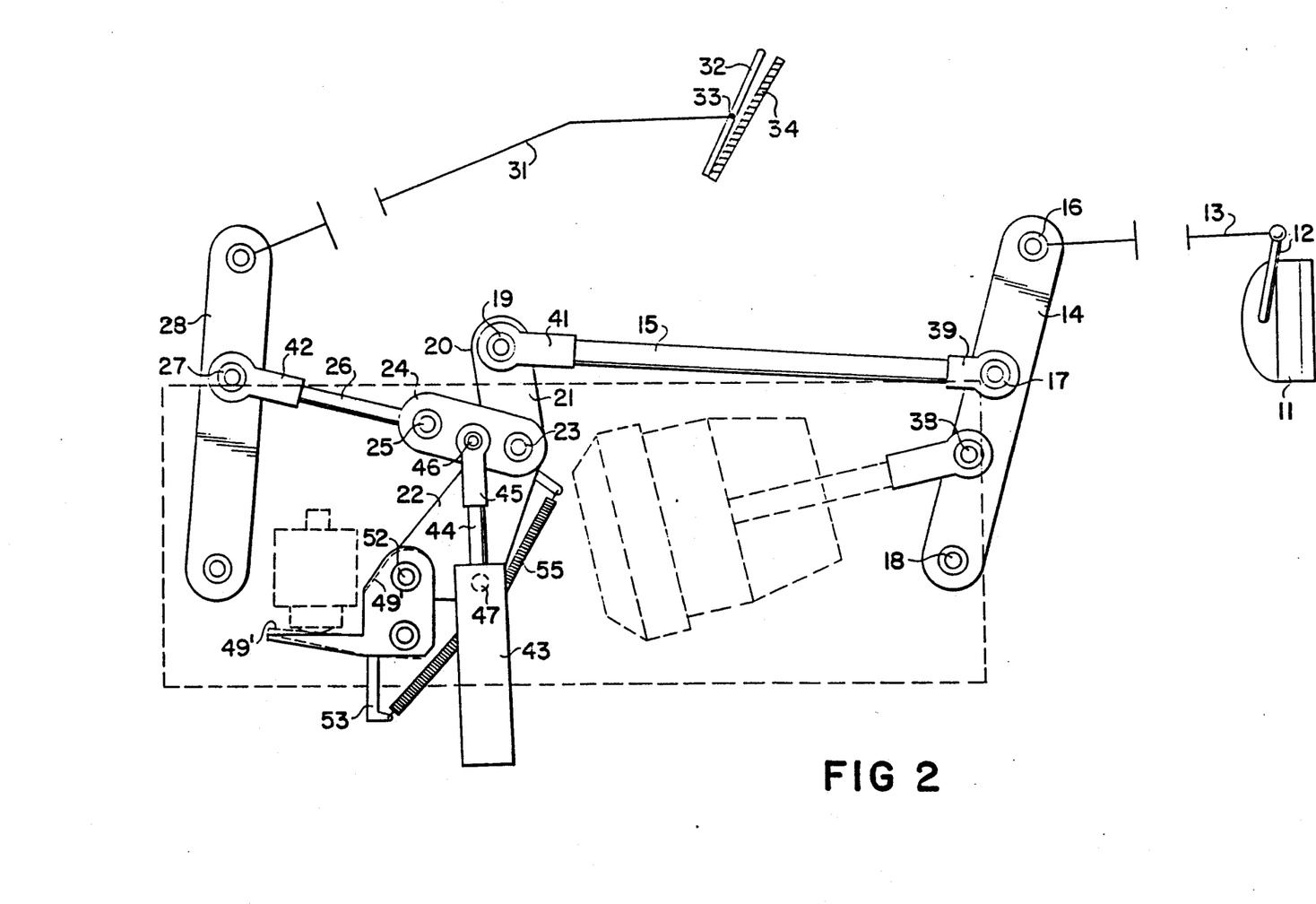
FIG. 2 is a partial side elevational view of the actuator of FIG. 1, portions thereof being moved into a second position to release the clutch.

With respect now to FIGS. 1 and 2, it can be seen that if high pressure air is available, the forward movement of master lever 20 will result in air being supplied to power chamber 35 via the pivotal motion of rocker link 49 which opens valve 58 as rocker link valve operating arm 50 depresses valve button 61. High pressure air to power chamber 35 causes extension of piston rod 36 which aids the manual forces applied against operating lever 14 to disengage the clutch 11'. In this "high pedal mode", the force applied to disengage clutch plate 11 is derived from manual foot pressure against pedal 32 and the power assist from power cylinder 35 which receives air from control valve 58 operating via rocker link 49. Reliability is also assured because there is an operational mechanical linkage between pedal 32 and clutch release lever 12 at all times which thus allows for a purely manual operation in the event of a failure of air system 69. In high pedal mode, the manual force on pedal 32 will be dominant, as hereinafter more fully described.

Figure 3:
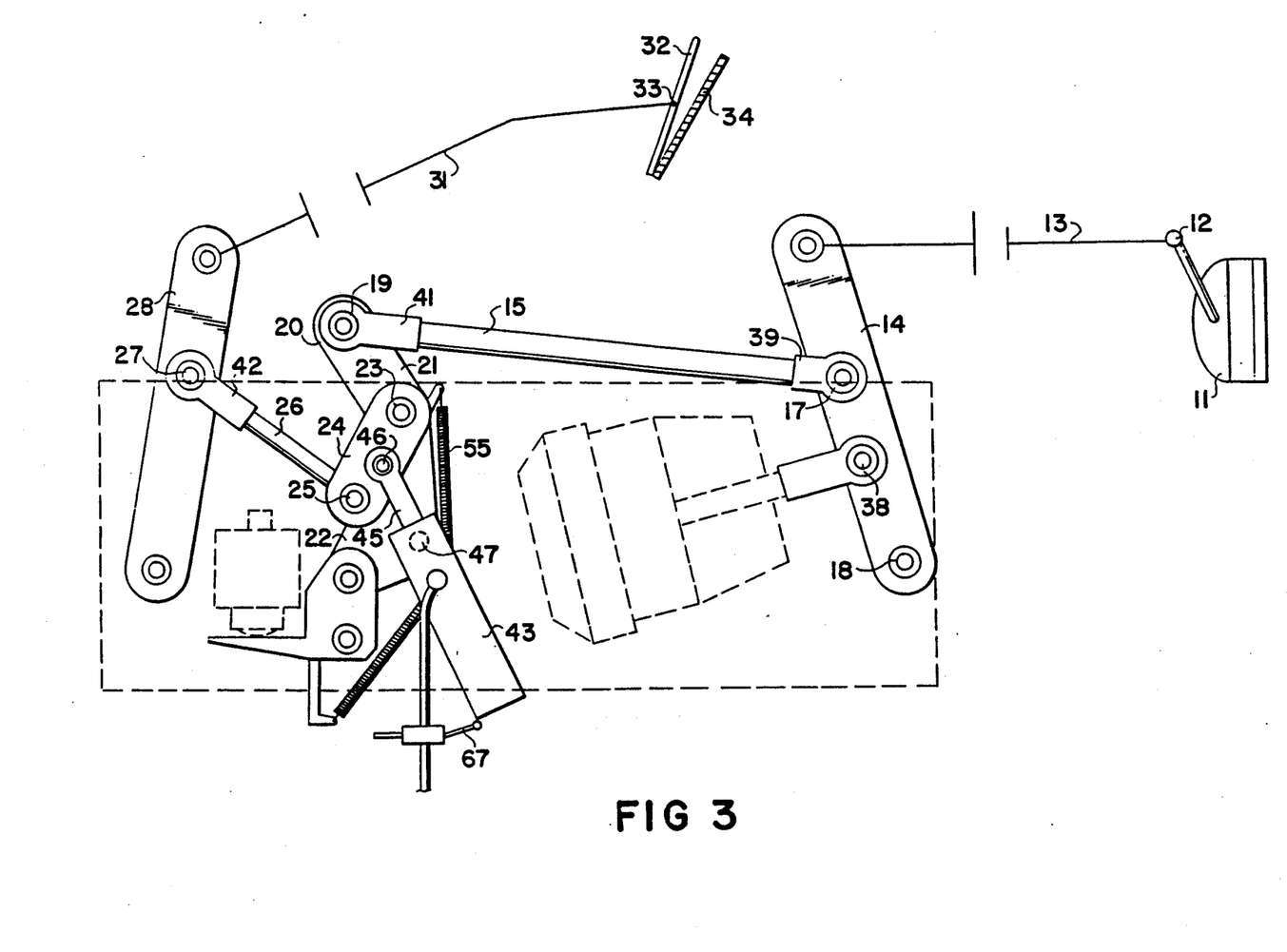
FIG. 3 is another partial side elevational view of FIG. 1, with portions being in a third position and illustrating the low pedal mode.

With reference now to FIG. 3, the "low pedal mode" of operation can be described. The only step required to operate in the low pedal mode is to open staging valve 66 by moving toggle 67 to the illustrated position. Preferably, staging valve 66 is a conventional three-way, two-position valve with exhaust port 66' and is mounted on or near the dashboard to be within easy reach of the driver.

When air staging valve 66 is opened, staging cylinder piston rod 44 is pneumatically retracted to pull staging link 24 downwardly as shown from its initial position. The pivotal movement of staging link 24 will pull control lever 28 forwardly via control rod 26 and push pedal 32 towards the floor 34. Preferably, pedal 32 moves about five inches or about half the distance it travels in the high pedal mode.

Figure 4:
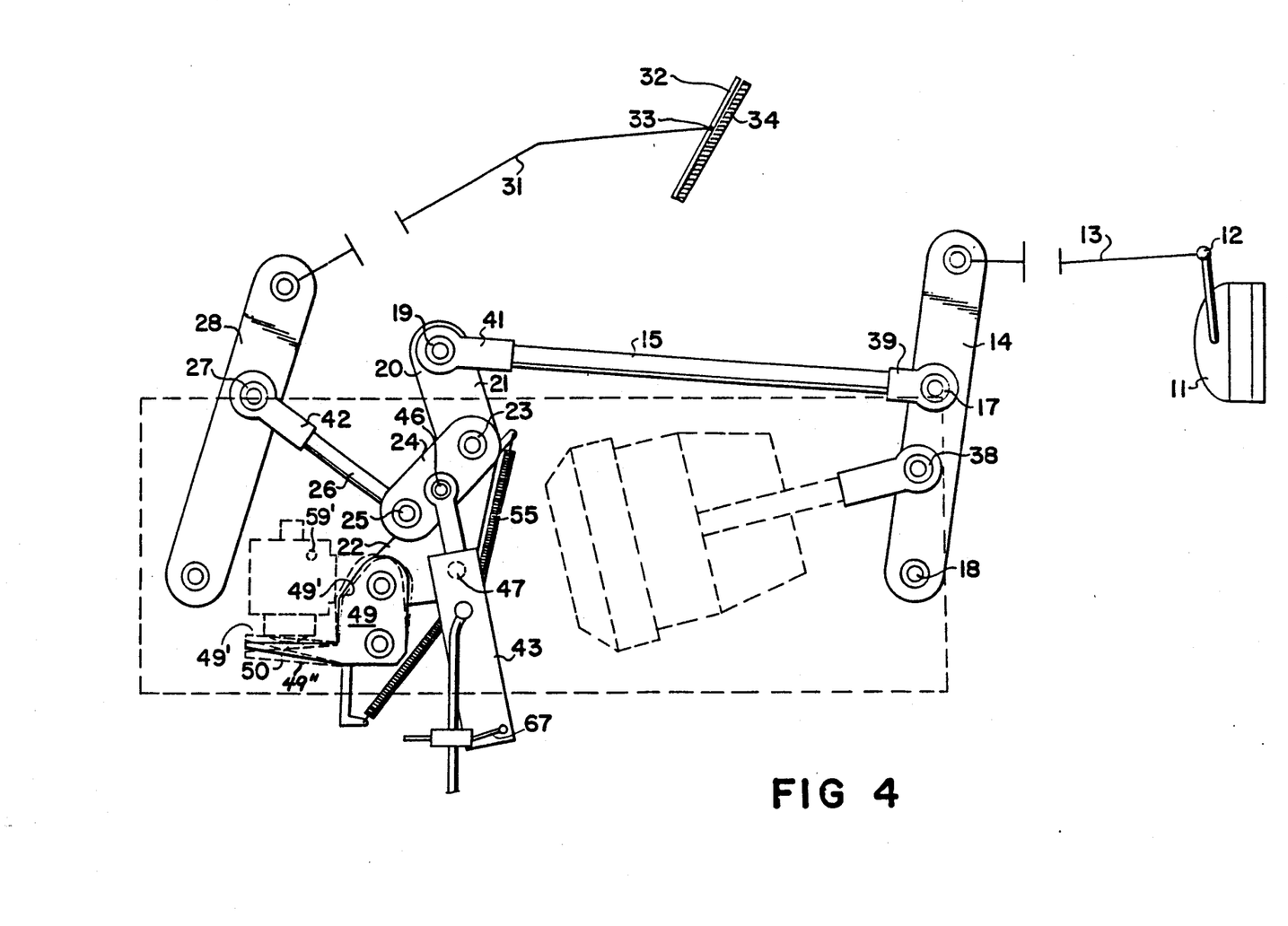
FIG. 4 is another partial side elevational view of FIG. 3, with portions being moved into a fourth position to release the clutch.

As shown in FIG. 4, with the foot pedal 32 in the low pedal mode, manual force applied to pedal 32 will move control lever 28 forwardly of the initial, substantially vertical position. In this mode however, control rod 26 is positioned downwardly and the force is directed to pin 25 which reacts against master lever 20 at the lower arm 22 of lever 20. As master lever 20 is moved forwardly, rocker link 49 is pivoted from the original position of broken lines 49" to broken lines 49' in FIG. 4, against the force of springs 55 and 60 about shaft 51 opening air control valve 58. Greater force is applied to rocker link 49 in the low pedal mode than in the high pedal mode. In addition, less manual force is applied to operating lever 14 via operating rod 15 in the low pedal mode than in the high pedal mode. With a greater percentage of the force applied to rocker link 49, more air pressure is applied to power chamber 35 with the result that the action of piston rod 36 will be dominant in the low pedal mode.

In both the high and low pedal modes of operation, spring 55 provides two interrelated functions. First, spring 55 acts with spring 60 to pivot rocker link 49 back to its normal position after operation causing valve operating arm 50 to move downwardly which will return air control valve 58 to a closed or an exhaust position. Air control valve 58 is selected to exhaust air from power chamber 35, line 69 and the exhaust port 59' of valve 58 itself when spring 60 operates valve button 61, which returns link 49 to the broken line 49" position against stop 58'. Second, spring 55 acts as a return spring for staging cylinder 43. In the low pedal mode, piston rod 44 will be retracted for only as long as air is supplied via supply valve 66. When low pedal mode is no longer desired, valve handle 67·is moved to its closed position and air downstream in line 65 and in staging cylinder 43 is exhausted through port 66'. Spring 55 will cause staging link 24 to return to the high pedal mode position resulting also in the extension of piston rod 44. In addition, when pedal 32 is depressed, spring 55 provides a resistance to movement that is nonlinear and thus provides to the driver a better "feel" for clutch operation.

Many clutch mechanisms employ a clutch brake therein shown as brake 11". The clutch brake 11" operates to stop the spinning of transmission gears when in neutral in order to allow for operation into gear or shifting to be accomplished more smoothly. Generally speaking, the present invention contemplates operation of the clutch plate 11 in the high pedal mode when a truck is initially to be moved or in movement of a truck in short precise steps such as those needed in a crowded freight yard. Low pedal mode will be used for most of the actual highway driving and the power-assist in conjunction with low pedal mode will help in reducing driver fatigue. Finally, many drivers may accidently engage the clutch brake 11" during a normal gear shift operation by depressing the pedal 32 to the floor. A clutch brake 11"·is normally engaged by moving the release lever 12 to its extreme forward position. The levers and rods in the present invention are aligned to prevent movement of release lever 12 to its forward extreme clutch brake-engaging position when in the low pedal mode.

Figure 5:
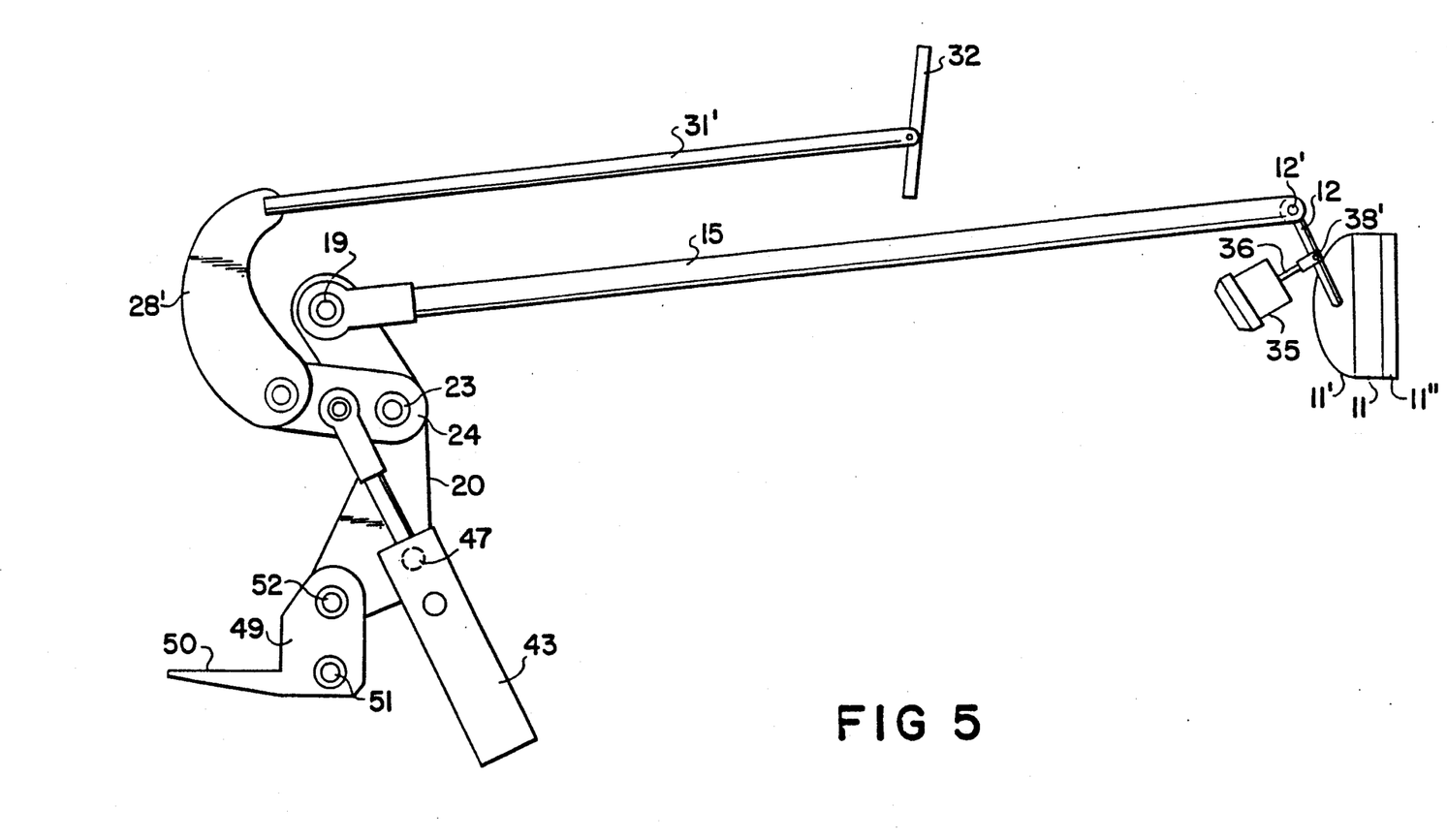
FIG. 5 is a partial side elevational view of another embodiment of the actuator in accord with the present invention, with portions of the assembly omitted for clarity of illustration.

FIG. 5 illustrates the present invention for installation in a truck by an original equipment manufacturer (OEM). In this embodiment, power chamber 35 is connected directly to clutch release lever 12 at point 38'. Operating rod 15' is connected to the release lever 12 at point 12'. Control lever 28 and control rod 26 can be replaced by a curved control arm 28' which is connected to a foot pedal 32 via whatever pedal linkage 31' is desired in the circumstances. The operation of the clutch plate 11 is as before. Rocker link 49 is pivoted by movement of master lever 20 via staging link 24. In low pedal mode, movement of control arm 28' will result, as before, in greater force below the center pivot pin 23 at pin 46 contact point against lever 20 and therefore the power-assisted force of power chamber 35 will be dominant.

Figure 6:
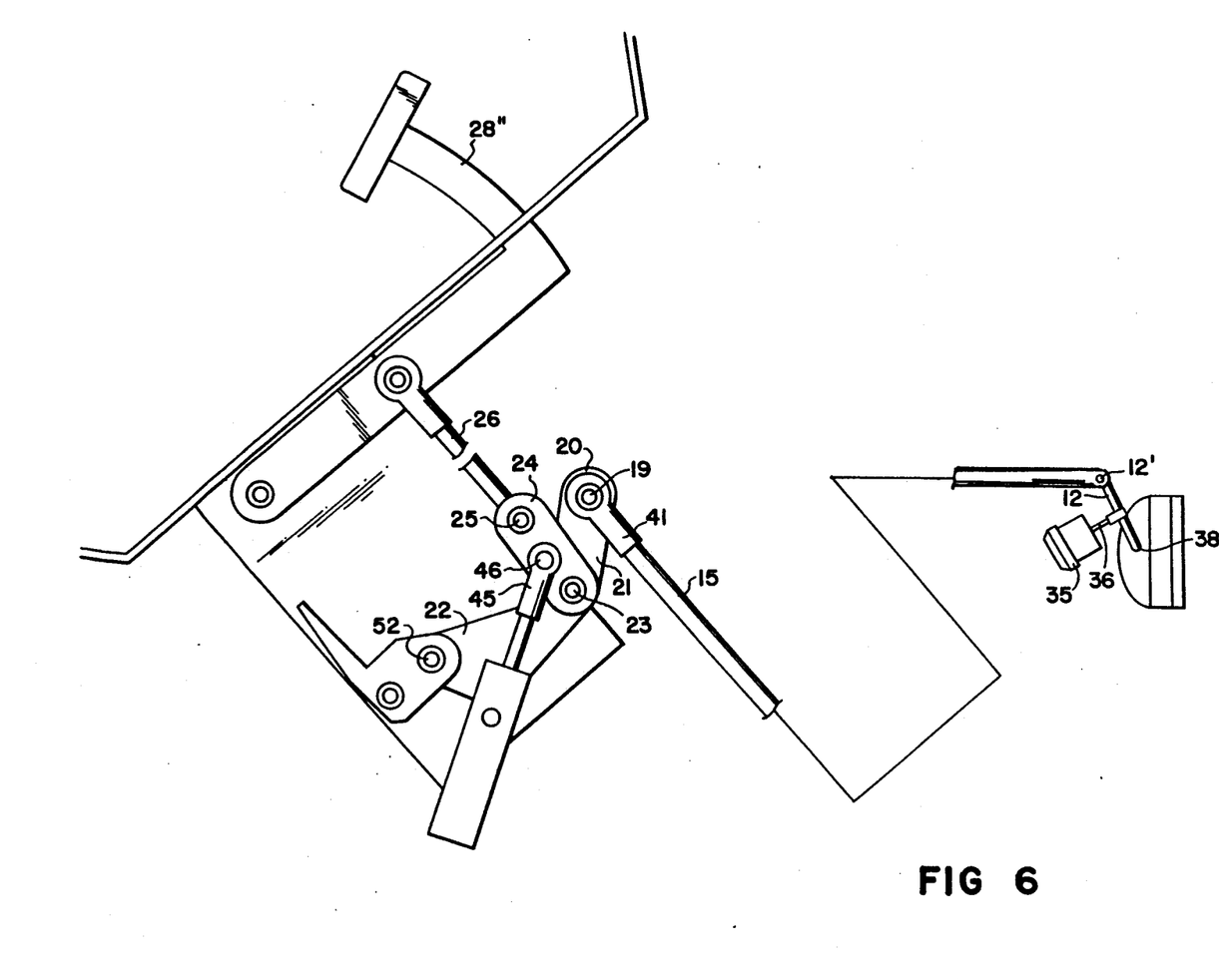
FIG. 6 is a partial side elevational view of a third embodiment of the actuator in accord with the present invention, with portions of the assembly omitted for clarity of illustration.

Another embodiment of the present invention is illustrated in FIG. 6. Control lever 28" now functions as the foot pedal with return springs connected where necessary in a particular truck. The operation of the clutch plate 11 is the same as in the other embodiments discussed hereinabove. The specific mechanical connection methods will vary depending upon, among other things, the type and location of the clutch assembly and the space available around it.

The choice of a particular embodiment of the present invention will be greatly influenced by when the clutch operating mechanism is installed (OEM or retrofit) as well as the physical dimensions of the space available near the clutch pedal 32 and clutch 11' for the apparatus and the associated connecting linkages that are utilized.

In conclusion, the present invention can be used in the high pedal mode with much of the force supplied via the pedal 32 with control of the clutch brake 11" available. In the low pedal mode, most of the force supplied is via the power chamber 35. This mode is where most of the driving and thus gear shifting will take place. The clutch brake 11" cannot be engaged in low pedal mode which thus prevents damage to clutch brake 11".

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a clutch mechanism comprising a clutch pedal means and a movable clutch plate means, said clutch pedal means having a predetermined length of stroke for operating said clutch plate means in response to manual forces adapted to be applied to said pedal means, a clutch actuator including first linkage means between said pedal means and said plate means for transmitting movement of said pedal means to said plate means, selective means operatively coupled to said first linkage means to vary the extent of movement thereof for reducing said stroke of said pedal means when said selective means has been selected to provide a reduced stroke, first power means operably connected to said first linkage means and being responsive to movement thereof for forcibly transmitting movement of said pedal means in response to applied manual forces to said pedal means through both said stroke and said reduced stroke, said selective means including manually operable second power means connected to said first linkage means, said second power means being operated to reduce the stroke of said pedal means required to disengage said plate means, said first power means and said first linkage means being connected and performing the work of moving said clutch plate means during manual operation of said clutch pedal means through both said stroke and said reduced stroke.

2. In the clutch mechanism as defined in claim 1 wherein said first linkage means includes a link, said link being pivotally mounted for movement between a first position and a second position, said second power means being coupled to said link for moving said link to said second position for restricting movement of said first linkage means when said second power means is operated.

3. In the clutch mechanism as defined in claim 1 wherein said first power means includes a third power means connected to said first linkage means for moving said plate means in a disengaging direction, valve means fluidly connected to said third power means, said valve means being responsive to depression and relaxation of said pedal means whereby fluid is correspondingly supplied to and removed from said third power means.

4. In the clutch mechanism as defined in claim 3 wherein said valve means includes a lever and a valve, said lever being connected to said first linkage means, said valve being operated by said lever when said pedal means is depressed for supplying said third fluid power means and relaxed to remove from said third fluid power means.

5. In the clutch mechanism as defined in claim 3 wherein said first linkage means includes a first lever connected to said clutch plate means, said third power means includes a power cylinder element and a piston element, means for coupling one said element to said first lever for movement of said first lever when fluid is supplied to said power cylinder element.

6. In the clutch mechanism as defined in claim 5 wherein said one element is connected to said first lever so that said third power means provides a dominant force in moving said clutch plate means through said reduced stroke.

7. In the clutch mechanism as defined in claim 3 wherein said first linkage means includes a first lever, said valve means being operated by said first lever, said first lever having a first position in which said valve means is closed and a second position in which said valve means is open, said first linkage means including a second lever operatively connected to said first lever, means for connecting said second lever in said first linkage means for movement in response to measurement of said pedal means for moving said first lever between said first and second positions.

8. In the clutch mechanism as defined in claim 7 wherein said means for connecting includes a link, said link being pivotally mounted to said second lever and movable by said selective means when selected from a first position in which said clutch pedal means is movable through said predetermined length of stroke to a second position in, which said clutch pedal means is movable through said reduced stroke length.

9. In the clutch mechanism as defined in claim 8 wherein said second power means includes a power cylinder element and piston element, means for coupling one said element to said link for movement of said link to said second position when a fluid is supplied to said power cylinder element.

10. In the clutch mechanism as defined in claim 8 wherein said link is seated against a portion of said second lever when said link is located in said second position.

11. In the clutch mechanism as defined in claim 1 wherein said second power means includes manually operable valve means for controlling a fluid being supplied to said second power means.

12. In the clutch mechanism as defined in claim 11 wherein said second power means includes a power cylinder element and piston element, means for coupling one said element to said first linkage means.

13. In the clutch mechanism as defined in claim 12 wherein said one element is spring-biased in a direction to allow said pedal means to be moved a predetermined distance, said valve means including an on-off valve, said on-off valve being in the ON condition to override the spring bias of said one element for reducing the stroke of said clutch pedal means.

14. In a clutch mechanism as defined in claim 1 wherein said first linkage means performs all of the work of moving said clutch plate means upon movement of said clutch pedal means by the manual application of force when said first power means is inoperable.

15. In the clutch mechanism as defined in claim 1 wherein said first power means is selectively actuatable so that said first power means provides a dominant force in moving said clutch plate means when said clutch pedal means is being moved through a selected said reduced stroke.

16. In the clutch mechanism as defined in claim 1 wherein said first power means is selectively actuatable so that said first power means provides a non-dominant force in response to manual force applied to said pedal means in moving said clutch plate means when said clutch pedal means is being moved through said predetermined length of stroke.

17. In a clutch mechanism comprising a clutch brake means, a clutch plate means and a clutch pedal means, said clutch pedal means having a first stroke length for disengaging said clutch plate means and a second stroke length for engaging said clutch brake means, said second length being greater than said first length, a clutch actuator including first linkage means operably connected between said pedal means and said clutch plate means and said clutch brake means for transmitting movement of said pedal means to said plate means and said brake means, selective means operatively coupled to said first linkage means for restricting the movement thereof for reducing the first stroke length to a third shorter stroke length when said selective means has been selected, first power means operably connected to said first linkage means and being responsive to movement thereof for forcibly transmitting movement of said pedal means in response to applied manual forces to said plate means, said brake means including a brake operatively connected to said clutch plate means and engagable by movement of said clutch pedal means through said second stroke length, said selective means including second power means connected to said first linkage means and being operated to reduce said first stroke length to said third stroke length, said first power means and said first linkage means performing the work of moving said clutch plate during manual operation of said clutch pedal, said second power means restricting the movement of said first linkage means when said third shorter stroke length has been selected to inhibit engagement of said brake means by said clutch plate means.

18. In the clutch mechanism as defined in claim 17 wherein said first linkage means includes a plurality of articulated members, said second power means including power cylinder element and piston element and means for coupling one element to one said member.

19. In the clutch mechanism as defined in claim 17 wherein said first means includes a third power means connected to said first linkage means for moving said plate means in a disengaging direction, valve means fluidly connected to said third power means, said valve means being responsive to depression and relaxation of said pedal means whereby fluid power is correspondingly supplied to and removed from said third power means.

20. In the clutch mechanism as defined in claim 17 wherein said second power means includes manually operable valve means for controlling the fluid being supplied to said second power means.

21. In the clutch mechanism as defined in claim 20 wherein said first linkage means includes a first lever, said valve means being operated by said first lever, said first lever having a first position in which said valve means is closed and a second position in which said valve means is open, said first linkage means including a second lever operatively connected to said first lever, means for connecting said second lever in said first linkage means for movement in response to said pedal means for moving said first lever between said first and second positions.

22. In the clutch mechanism as defined in claim 21 wherein said means for connecting includes a link, said link being pivotally mounted to said second lever and movable by said selective means when selected from a first position in which said clutch pedal means is movable through said first stroke length to a second position in which said clutch pedal means is movable through said third stroke length, said first linkage means being inhibited from causing said brake to be engaged by said plate means when said link has been moved to said second position.

23. In the clutch mechanism as defined in claim 22 wherein said second power means includes a power cylinder element and piston element, means for coupling one said element to said link for movement of said link to said second position when fluid is supplied to said power cylinder element.

24. In the clutch mechanism as defined in claim 22 wherein said link is seated against a portion of said second lever when said link is in said second position.

25. In the clutch mechanism as defined in claim 20 wherein said second power means includes a power cylinder element and piston element, means for coupling one said element to said first linkage means, said one element being spring-biased in a direction to allow said pedal means to be moved said first stroke length, said valve means including an on-off valve, said on-off valve being in the ON condition to override the spring bias of said one element for reducing the stroke of said clutch pedal means to said third stroke length.

26. In the clutch mechanism as defined in claim 19 wherein said first linkage means includes a first lever connected to said clutch plate means, said third power means including a power cylinder element and a piston element and means for coupling one said element to said first lever for movement of said first lever when fluid power is supplied to said power cylinder element, said one element being connected to said first lever so that said third power means provides a dominant force thereon when said clutch pedal means is moved through said third stroke length.

27. In a clutch mechanism comprising a clutch pedal means and a movable clutch plate means, said clutch pedal means having a first effective stroke length for operating said clutch plate means in response to forces applied to said pedal means, a clutch actuator including first linkage means having a plurality of articulated members between said pedal means and said plate means for transmitting movement of said pedal means to said plate means for operation of said plate means, mode selection means for selectively operating said plate means in a first mode selected from a manual operation mode and a first power-assisted operation mode by movement of said pedal means through said first effective stroke length or operating said plate means in a second power-assisted operation by movement of said pedal means through a second effective stroke length shorter than said first effective stroke length, said mode selection means including first power means operably connected to said first linkage means and response to movement thereof for forcibly transmitting movement to said plate means when supplied with pressurized fluid, second selectively actuatable power means operably connected to one said member for restricting movement of said first linkage means when selected, said first power means actuating said clutch plate means in response to manual movement of said pedal means through said second stroke length when both said first and second power means are actuated, said first power means actuating said clutch plate means in response to manual movements of said pedal means through said first effective stroke length when said first power means is actuated.

28. In the clutch mechanism as defined in claim 27 wherein said mode selection means includes valve means fluidly connected to said first power means for controlling the fluid thereto, said valve means being responsive to depression and relaxation of said pedal means respectively to supply to and remove fluid from said first power means.

29. In the clutch mechanism as defined in claim 27 wherein said mode selection means includes manually operable valve means fluidly connected to said second power means for controlling the fluid thereto, said valve means includes an on-off valve for controlling the restricting of the movement of said first linkage means, said on-off valve being in the ON condition to actuate said second power means for movement of said pedal means through said second stroke length.

30. In the clutch mechanism as defined in claim 27 wherein said second power means includes a power cylinder element and a piston element, one said element connected to said one member.

* * * * *